April 6, 1943. Q. E. BASHORE 2,315,764
METHOD OF INCREASING THE RESISTANCE OF PLANT LIFE TO FROST DAMAGE
Filed Feb. 23, 1940

INVENTOR
QUINTER E. BASHORE
BY HARRIS, KIECH, FOSTER & HARRIS
ATTORNEYS.

Patented Apr. 6, 1943

2,315,764

UNITED STATES PATENT OFFICE 2,315,764

METHOD OF INCREASING THE RESISTANCE OF PLANT LIFE TO FROST DAMAGE

Quinter E. Bashore, Covina, Calif.

Application February 23, 1940, Serial No. 320,308

5 Claims. (Cl. 47—2)

My invention relates to methods and apparatus for preventing damage to sensitive plant life by drop in temperature below freezing point and is specifically directed to a method of increasing the resistance of plant life to frost damage.

Species of plant life vary widely in hardiness, the term being taken in the sense of resistance to damage by temperatures below freezing. It may be generalized that each species has its own minimum point temperature or frost-damage point below which the temperature may not be reduced without injury; and the critical temperatures for various sensitive species may be found at various points between 32° F. and 20° F. A second factor, after hardiness, is the duratoin of exposure to the relatively low temperature. A brief drop in temperature below the critical point may be withstood without damage and the lower the temperature the shorter the exposure period without injury. A third factor is the physical condition of the plant, a healthy plant withstanding lower temperatures and longer periods of exposure without damage than a plant that is not in good condition. I have found some evidence for a fourth factor that has not been recognized heretofore. Apparently whether or not a plant is physiologically active for a period immediately preceding the exposure to low temperature has some effect in determining the resistance of the plant to frost damage.

Commercially, studies of the factors that enter into frost damage and methods of prevention are most important in relation to the citrus industry. Throughout the major portion of the United States, citrus trees may not be grown commercially because of severe winters. In a minor portion of the United States, the temperature so seldom crosses the freezing point that citrus trees may be cultivated with no thought of frost damage. In other areas of substantial extent in the south and southwest, the outdoor temperature drops but a very few degrees below freezing in winter and does so only at night. Citrus plantings are widespread in such regions because it is commercially practical to use artificial heat in citrus groves to combat temperature drops at night of 4° F. to 5° F. below the critical temperatures. While it is to be understood that my invention is widely applicable to agriculture in general and especially to floriculture, the present disclosure will be directed to citrus culture.

The prevailing mode of artificially heating citrus groves is by employment of orchard heaters burning fuel oil or other fuel. Artificially heating an orchard is relatively expensive because the original investment is large, the fuel requirements are heavy and considerable labor is required to tend orchard heaters during a cold period. At present the overwhelming majority of orchard heaters in service produce quantities of black smoke that commonly overlie whole countrysides, smudging everything indoors as well as outdoors at considerable cost to the neighboring communities.

Orchard heaters prevent frost damage by direct action in that they are operated for the purpose of raising the environmental temperature thereby to prevent the plant life from being subjected to temperature below the damaging point. To keep the temperature in the environment of a citrus grove from dropping below the damage point when the prevailing temperature of the locality makes such a drop, it is necessary to heat continuously a tremendous volume of air under the best conditions, and the volume that must be heated is increased greatly under wind conditions or where the topography is such as to set up unfavorable air flow.

I have discovered that by employing infra-red radiation, I may achieve protection against approximately the same range of damaging temperatures as achieved by the usual installation of orchard heaters without the necessity of maintaining the environmental temperature above the frost-damage point and without the necessity of heating any of the air surrounding the frost-susceptible plant life. Clear air is diathermanous, i. e., transparent with respect to infra-red rays, transmitting the rays without absorbing any substantial temperature from the rays; on the other hand, plant life has high absorptivity with respect to infra-red rays and such absorption causes substantial immunity to frost damage.

It is conceivable that frost prevention by the use of infra-red rays is attributable purely to the physical effect of the absorption by the plant life of the energy represented by the rays, the energy being converted directly into heat in the plant tissues. There is evidence, however, for the theory that the infra-red rays incite and sustain physiological activity, perhaps plant metabolism, that makes a plant immune to low temperatures that would otherwise be injurious, the infra-red rays in effect lowering the frost-damage temperature point of the plant. That some kind of physiological activity is involved is indicated by the fact that exposure of citrus trees to infra-red radiation at night causes reduction in the ratio of solids found in the fruit on the trees. In one experiment samples of oranges were taken from various dark portions of a grove and compared with samples taken from trees exposed to infra-red radiation. The test procedure consisted of lightly squeezing juice from cuts in the fruit twelve hours after picking and testing the juice with a laboratory refractometer of the Abbe type. In each case a record was made of the indicated percentage of soluble solids at 20° C. without correcting for acid effect on the refractometer readings. Results consistently showed that exposure to infra-red rays reduced the per cent of soluble solids and it was further discovered that the exposure to infra-red rays lowered the ratio of soluble solids at the blossom end of the fruit to the soluble solids at the stem end of the fruit. Whatever the correct theory may be, I have definitely established that infra-red radiation may be employed to prevent frost damage while the environmental temperature, the temperature of the air enveloping the plant life, is below the frost-damage temperature point of the plant life.

I have further established the fact that the resistance to frost damage that I achieve is not to be accomplished by merely illuminating the plant life. Apparently the range of electromagnetic radiation that is effective for my purpose is to be found near the red end of the visible spectrum. I have ascertained experimentally that a conventional electric lamp ordinarily employed for illumination is not effective for my purpose when energized at the voltage for which the lamp is designed, whereas if the voltage is substantially reduced below the intended potential to cause the emitted light to shift toward the red end of the visible spectrum, the lamp may to some extent serve my purpose of protecting plant life from frost damage.

My most successful experiments have been conducted with a carbon filament 260 watt lamp of a widely distributed type that is known commercially as a therapeutic infra-red lamp. It is believed that the maximum portion of the rays emitted by such a lamp is in the visible red and infra-red ranging between 6500 A. and 16,000 A. In my preferred practice I energize such a lamp with current 20% under the intended voltage, thereby to favor the generation of infra-red rays. I believe that the penetrating range between 6500 A. and 14,000 A. is the most effective range, but infra-red rays of longer wave length may also be effective. Such a carbon filament lamp emits approximately 85% or more infra-red, whereas the usual lamp employed for efficient illumination emits only approximately 5% infra-red. I have not ascertained precisely what intensity of light is necessary to achieve my end, but I have reason to believe that infra-red rays from such infra-red lamps have some effect at least 200 feet away from the source. It is apparent that other sources for such rays may be employed including open flames and heated bodies both solid and gaseous.

I have not ascertained just what proportion of total leaf-area of a plant must be irradiated to produce the desired effect, but I believe that at least half the peripheral area of a citrus tree should be exposed to infra-red light, and for best results I believe that from ¾ to ⅞ of the peripheral area of a citrus tree should be irradiated.

I have further discovered that if the plant life to be protected against frost is irradiated for a substantial period immediately prior to the low temperature period, the effectiveness of infra-red radiation during the low temperature period will be increased. In other words, it is desirable to precondition the plant life by infra-red radiation as well as to maintain such radiation during the low temperature period.

From the foregoing discussion, it is apparent that the general object of my invention is to provide a simple procedure for increasing the resistance of plant life to frost damage at sub-critical temperatures thereby to prevent frost damage without relying on heating the air surrounding the plant life.

A further object of my invention is to stimulate and sustain physiological activity in plant life during periods when excessive climatic conditions would otherwise hold such physiological activities in abeyance. One of my more specific objects in this respect is to reduce the number of tree-ripened lemons in a lemon grove during a period of unfavorable temperatures. In favorable seasons lemons continue to grow in size until relatively large, but in seasons marked by prolonged periods of relatively low temperature, the fruit on lemon trees stops growing and begins to change color. I propose by employing infra-red radiation to reduce such premature tree ripening.

Other objects and advantages of my invention may be understood by considering a typical installation and I shall describe the manner in which such 260 watt infra-red lamps may be distributed in a citrus grove to produce immunity from frost damage over a range of at least 4° F. below the normal frost-damage temperature point for the particular species of citrus tree planted in the grove.

In the drawing, which is to be taken as illustrative only:

Figure 1:
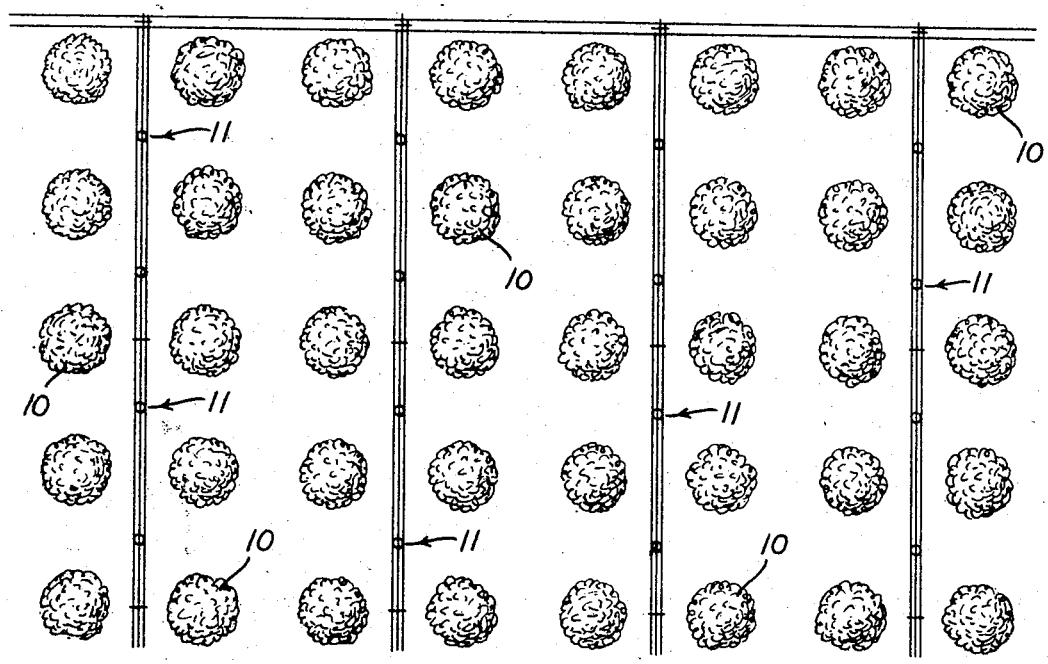
Fig. 1 shows in plane a typical citrus grove equipped with infra-red lamps.
Figure 3:
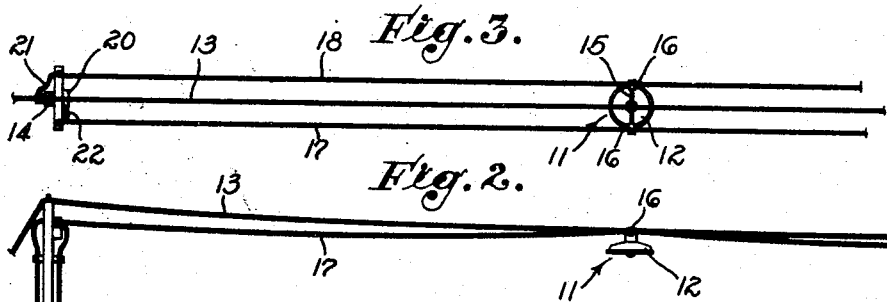
Fig. 3 is a plan view of the lamp and pole of Fig. 2.

Fig. 1 shows a typical lemon grove in the frost section of southern California in which a plurality of lemon trees 10 are planted twenty feet apart in rows spaced twenty feet. I have found that the required intensity in infra-red radiation and the required distribution to reach all of the individual trees may be achieved by placing infra-red lamps generally designated 11 along every other lane or aisle across the grove, each lamp in a lane being substantially equidistant from the nearest four trees. In such an arrangement the lamps are twenty feet apart in one dimension of the grove and forty feet apart in the other dimension. Each tree is irradiated from two relatively close lamps in an adjacent lane as well as by more distant lamps in the same lane and lamps in other lanes. Preferably, the various lamps 11 are at levels well above the top of the trees 10, so that the lamps may shine over nearby trees to reach more distant trees, the usual height of the lamps being from twelve to sixteen feet. By distributing the lamps at elevated positions in the manner described, I irradiate at least three-quarters and more often seven-eighths of each of the individual trees, and by employing the previously mentioned 260 watt infra-red lamps I provide sufficient intensity of radiation to achieve the same effectiveness in prevention of frost damage as is provided by a typical installation of orchard heaters.

Figure 2:
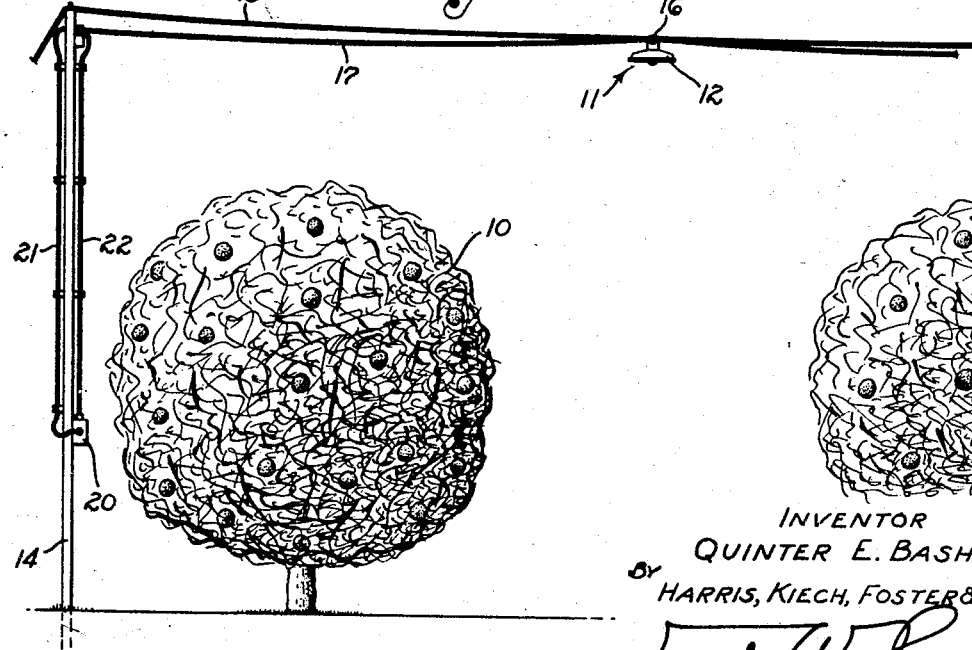
Fig. 2 is a side elevation on an enlarged scale showing one lamp and one of the supporting poles used in the installation shown in Fig. 1.

In the method of supporting the lamps at the elevated position that is suggested by Figs. 2 and 3, the lamps are mounted in relatively shallow concave reflectors 12 that are supported by overhead cables 13 held aloft by posts 14. Preferably, each of the reflectors is constructed as taught by my Patent No. 2,276,559, issued March 17, 1942, entitled "Clamp for attachment to cables." Each of the reflectors 12 of the preferred type has a spreader bar 15 at the ends of which are suitable conductors 16 for attachment to the two energizing wires 17 and 18 respectively.

In my preferred arrangement, the plurality of lamps in an orchard is controlled by a master thermostatic switch 20 mounted on one of the poles 14 and connected to the lamp circuit by wires 21 and 22. Such a thermostatic switch provides for energizing and de-energizing the infra-red lamps automatically as required by temperature conditions and preferably is set to turn on the lamps whenever the temperature falls to approximately 39° F. Such an adjustment in southern California results in radiation being initiated approximately two hours in advance of the thermometer dropping to 32° F., and, as stated before, radiation of plant life immediately prior to a cold period followed by continuous radiation during the cold period is more effective than radiation confined to the cold period.

The frost-damage point for lemons at night is 29° F., but infra-red radiation provided in the manner described immunizes lemon fruit and foliage to frost damage down to 25° F. or 24° F., substantially the same protection as provided by conventional orchard heaters.

I prefer to turn on the infra-red lamps when the temperature drops to approximately 39° F. not only for the sake of preconditioning the trees and friut for a cold period, but also to reduce tree-ripening. I believe that when the environmental temperature drops to approximately 39° F., a lemon tree and the fruit thereon ceases to grow and the fruit immediately tends to become ripe regardless of size. Apparently the infra-red radiation initiated when the environmental temperature drops to 39° F. has sufficient physiological effect to prevent tree-ripening and I believe that the infra-red radiation actually sustains growth activity. In a test plot protected by infra-red lamps in the manner described throughout a winter season that included several nights below 32° F., the foliage and fruit of the trees suffered no frost damage whatsoever, the crop was of superior quality, and tree-ripened fruit averaged only 1% of the crop in contrast to 40% of crops produced by other groves in the same district.

The above-mentioned test plot is a two and a half acre grove close to the official Weather Bureau Temperature Station, No. 43, in the Azusa, California, district, and the test extended through the winter of 1938–1939. The published observations made at this station show that on the night of February 1–2, 1939, the temperature was below 32° F. thirteen hours and thirty minutes; below 31° F. thirteen hours; below 30° F. twelve hours and ten minutes; below 29° F. ten hours; below 28° F. eight hours and thirty minutes; below 27° F. six hours and thirty minutes; below 26° F. five hours and forty-five minutes; below 26° F. one hour and ten minutes, the minimum temperature being 25° F.

On the two and a half acre test plot I employed one hundred and twenty-eight of the 260 watt lamps, an average of fifty-two lamps per acre amounting to between 13 and 14 kilowatts per acre. I believe that further studies will indicate that the energy output may be reduced to as low as 7 kilowatt hours. Such an installation costs more than a set of orchard heaters to protect the same acreage to the same extent, but the running cost of frost protection by orchard heaters is excessive. Fuel cost alone is approximately $1.00 per hour per acre; labor to maintain the heaters in operation must be employed throughout the cold period; and all of the orchard heaters have to be replaced in a few years. In contrast, an installation of infra-red lamps controlled by a thermostatic switch requires no operating labor whatsoever; the cost of current at ¾¢ per kilowatt-hour is not more than 11¢ per acre per hour; and the only replacement required over a period of years is the replacement of the various lamps, each lamp having a life of at least 1000 hours.

My disclosure will suggest to those skilled in the art various modifications and departures within my concept, and I reserve the right to all such modifications and departures that come within the scope of my appended claims.

I claim as my invention:

1. A method of preventing frost damage to plant life by a lowering of environmental temperature from a temperature above the frost-damage point temperature of the plant life to a temperature substantially below said frost-damage point temperature comprising irradiating the plant life with sufficient infra-red radiation outside the visible band to incite and sustain frost-resisting physiological activity producing chemical change in the plant life, the period of irradiation being initiated substantially in advance of the environmental temperature reaching said frost-damage point to insure that such activity is widespread in the plant life and occurs at an effective rate at the moment the environmental temperature reaches said frost-damage point.

2. A method of preventing frost damage to a plurality of plants in a planted plot that comprises emitting infra-red rays from a plurality of points distributed over said plot to irradiate the major peripheral areas of the various plants on the plot, a major portion of said rays being of wave lengths below 16,000 A.

3. A method of preventing frost damage at night to a plurality of plants in a planted plot that comprises the steps of: emitting infra-red rays from a plurality of elevated points over said plot, said infra-red rays including substantial emission of penetrating wave lengths longer than wave lengths of the visible spectrum sufficient to incite and sustain frost-resisting physiological activity producing changes in the soluble solids in said plants; and reflecting downward the rays that radiate upward from said emission point, said points being distributed over the plot to irradiate at least half the peripheral areas of the various plants on the plot.

4. A method of reducing the tree-ripening of fruit on a citrus tree during unfavorable weather above the frost-damage temperature of the fruit, said method comprising irradiating the tree during daylight hours with infra-red rays to incite physiological activity in the tree.

5. Means for preventing frost damage to a plurality of plants in a planted plot, comprising: a plurality of infra-red generators distributed over the planted plot, said infra-red generators being constructed and arranged to radiate in major portion rays of wave lengths below 16,000 A.

QUINTER E. BASHORE.